United States Patent [19]
Dryer

[11] 3,951,418
[45] Apr. 20, 1976

[54] MOVING CAPTIVE SEAL CONSTRUCTION USABLE UNDER HIGH TEMPERATURE AND CRYOGENIC CONDITIONS

[75] Inventor: Eldon O. Dryer, Malibu, Calif.
[73] Assignee: W. S. Shamban & Co., Los Angeles, Calif.
[22] Filed: Jan. 21, 1974
[21] Appl. No.: 434,803

[52] U.S. Cl. .............................. 277/124; 277/233; 277/185
[51] Int. Cl. ........................................... F16j 15/24
[58] Field of Search ...... 277/124, 108, 30, 181–185, 277/227, 231, 233, 235 R, 106, 102, 116.2, 121

[56] References Cited
UNITED STATES PATENTS

| | | | |
|---|---|---|---|
| 757,597 | 4/1904 | Caldwell | 277/106 |
| 783,644 | 2/1905 | Norris | 277/106 |
| 2,733,969 | 2/1956 | Polk | 277/231 |
| 3,572,735 | 3/1971 | Dryer | 277/235 R |

*Primary Examiner*—Robert I. Smith

[57] ABSTRACT

A captive sealing assembly including a sealing mass of deformable material and first and second retainers on opposite sides of the sealing mass. The sealing assembly is adapted for use in a seal groove at least partially defined by first and second surfaces to be sealed. The first and second surfaces and the retainers cooperate to define a completely enclosed seal cavity of variable volume for the sealing mass. The retainers are resiliently loaded in a direction to compressively load the sealing mass.

14 Claims, 8 Drawing Figures

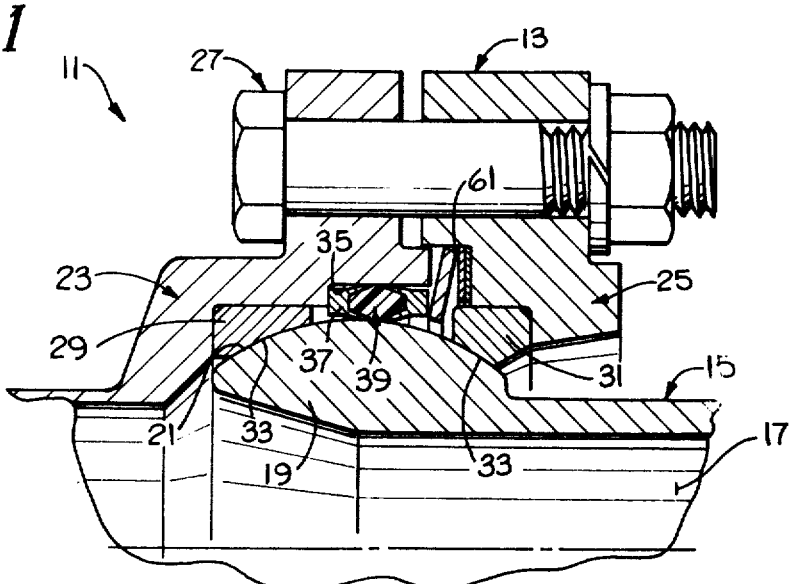
Fig. 1
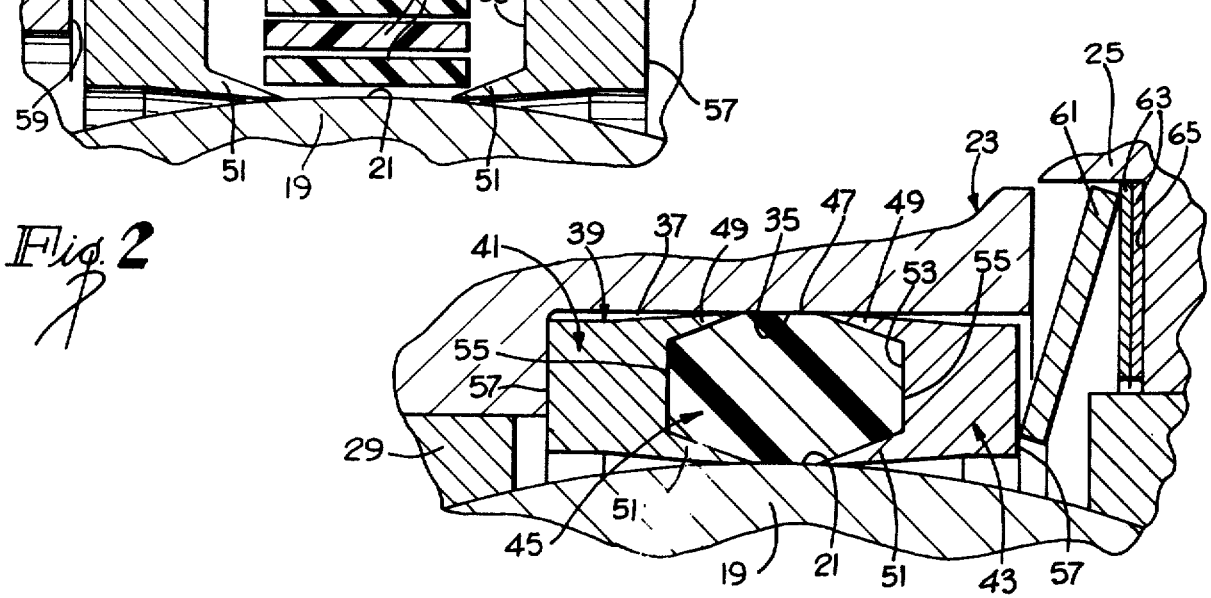
Fig. 2
Fig. 3

MOVING CAPTIVE SEAL CONSTRUCTION USABLE UNDER HIGH TEMPERATURE AND CRYOGENIC CONDITIONS

BACKGROUND OF THE INVENTION

A captive seal is one in which a sealing material is completely confined and compressively loaded beyond its yield point. The sealing material substantially completely fills the seal cavity in which it is positioned. The compressive loading is sufficient to cause the sealing material to flow into the minute crevices and surface irregularities of the wall of the cavity to form a tight seal. One advantage of captive seals is that the surfaces which confine the seal need not have a good surface finish. Captive seal constructions are shown, for example, in U.S. Pat. Nos. 3,572,735 and 3,594,022.

In using a captive seal, it is essential that the sealing material be highly compressively loaded into the surface to be sealed. In the absence of such loading, the sealing material will not engage, or will not engage with sufficient pressure, the surface to be sealed. Under these circumstances, leakage is likely to occur.

It is usually not difficult to adequately load the sealing material initially. However, in use, the compressive force applied to the sealing material may be reduced as a result of dimensional changes caused by thermal changes, elastic deformation of the parts, or other factors. For example, a captive seal may be initially compressively loaded at ambient temperatures, and thereafter be subjected to cryogenic temperatures down to 450° F or to high temperatures up to 500° F. Under these circumstances, the different coefficients of expansion of the parts of the system may result in a significant loss of compressive pressure in the sealing material.

One effort to solve this problem involves the use of resilient retainers to assist in confining the sealing material. This approach is disclosed, for example, in U.S. Pat. No. 3,572,735 referred to above. The theory underlying use of a resilient retainer is that any relaxation in the sealing material will be "taken up" by expansion of the resilient retainer. Unfortunately, in the patented construction, one of the resilient retainers does not function to take up any relaxation in the sealing material. Although the other of the retainers is resiliently expandable as the sealing material relaxes, it is of intricate wave-like configuration. As such, this latter retainer is difficult and expensive to make.

Another problem occurs when the sealing material expands more rapidly than the walls of the seal cavity in which it is positioned. In this event, there is some danger that the pressure of the expanded sealing material will cause damage to the adjacent parts of the system. In the patented construction, the wave-like retainer is not capable of permitting much, if any, expansion of the sealing material after the sealing material has been compressively loaded.

SUMMARY OF THE INVENTION

The present invention eliminates the need for resilient or intricately shaped retainers while providing for taking up of any relaxation in the sealing material. This is accomplished, at least in part, by using resilient means other than the retainer for resiliently loading the sealing material. Accordingly, the resilient means tends to make up for any loss of compressive stress in the sealing material. Conversely, the resilient means can be compressed to absorb some expansion of the sealing material. This simplifies retainer construction and reduces manufacturing cost.

In one form of the construction shown in U.S. Pat. No. 3,572,735, a spring is employed. However the spring does not compressively load the sealing material, and furthermore, the spring force tends to resist, rather than assist, loading of the sealing material.

As is necessary for all captive seals, the present invention provides containing means for substantially completely enclosing a seal cavity. A sealing mass of deformable sealing material is positioned in the seal cavity. The containing means includes the surfaces to be sealed and first and second retainers. The retainers form end walls for the seal cavity.

In the typical captive seal, the surfaces to be sealed are movable to compressively load the sealing material. Unlike the usual captive seal, with this invention the compressive load is applied to the sealing material through movable retainers rather than through the surfaces to be sealed. To accomplish this, the retainers are relatively movable in a direction to reduce the volume of the seal cavity and to compressively load the sealing material. By moving the retainers, the sealing material is caused to flow into intimate contact with the surfaces to be sealed and to substantially fill the seal cavity. One advantage of applying the compressive load to the sealing material through the retainers is that it adapts captive seals for new applications such as where the surfaces to be sealed move relative to each other. Although the captive seal can be used in different environments, it is adapted for use in a seal groove defined by radially spaced, circumferentially extending surfaces to be sealed. For example, the captive seal is usable in swivel joints and ball joints. When so used, the retainers are axially spaced and movable axially to compressively load the sealing material.

The retainers are not resilient in the sense that they inherently compensate for expansion or relaxation of the sealing mass and they need not be resiliently deformable in any sense. However, there is an advantage to constructing the retainers so that portions thereof deform resiliently in a direction generally perpendicular to the direction of movement of the retainers and perpendicular to the direction of the compressive loading force applied to the retainers. For example, if the retainers are axially movable, portions of the retainers may be deformable in a radial direction. This resilience allows the compressively loaded sealing material to force such portions tightly against the surfaces to be sealed and allows the retainers and the surfaces to be sealed to be constructed within looser tolerances than might be permitted if a resilient quality of this type were not provided. Structurally, such resilience can be provided by a relatively thin lip adapted to engage the surface to be sealed.

The captive seal construction of this invention can advantageously include an outer member circumscribing an inner member with at least one of the members including first and second sections relatively movable toward each other. The outer and inner members include first and second surfaces, respectively, which are radially spaced apart to at least partially define a seal groove therebetween. The first and second retainers are drivingly associated with the first and second sections, respectively, so that movement of the sections toward each other moves the retainers toward each other to reduce the volume of the seal cavity.

The resilient means can take different forms. For example, the first retainer can be resiliently loaded by a spring acting between the first retainer and the first section. Alternatively, the resilient means can include the fastener for moving the first and second sections toward each other. The first section may be sufficiently resilient so as to constitute at least a portion of the resilient means.

In a typical captive seal, the sealing material is appropriately machined or otherwise contoured to the appropriate configuration and volume in relation to the seal cavity. The present invention teaches that this time-consuming process can be eliminated by utilizing multiple layers of the sealing material. For example, the sealing material can be provided in an elongated strip. The elongated strip can be wound around the inner member in the seal groove until the necessary volume of sealing material is in the seal groove. Alternatively, the sealing material may be provided in a plurality of discrete sections such as small particles. In either case, the need for machining or otherwise contouring the sealing material is eliminated. The strip or particles coalesce into a solid sealing body when external pressure is applied.

The use of a captive seal under cryogenic conditions in a circumferentially extending seal groove having radially spaced surfaces to be sealed presents a special problem. Under cryogenic conditions the sealing material shrinks and causes a loss of compressive force. Also, the sealing material pulls away from the outer surface. The circumferential shrinkage of the sealing material under cryogenic conditions in turn tends to maintain tight sealing contact between the sealing material and the inner surface of the seal cavity.

To prevent complete separation and leakage between the sealing material and the outer surface under these conditions, the present invention provides axially movable retainers, one of which has an appropriately inclined ramp. The retainers are resiliently urged toward each other. The ramp is inclined in axial cross section so that it extends radially outwardly as it extends axially outwardly. If the sealing material shrinks and tends to pull away from the outer surface, the retainers are axially advanced toward each other by the spring and this urges the portion of the sealing material adjacent the ramp radially outwardly toward the outer surface. This tends to maintain sealing contact between the outer surface and the sealing material.

The invention can best be understood by reference to the following description taken in connection with the accompanying illustrative drawing.

BRIEF DESCRIPTION OF THE DRAWING

FIG. 1 is a fragmentary sectional view of a ball joint having a captive seal construction of this invention embodied therein.

FIG. 2 is an enlarged view of the portion of FIG. 1 adjacent the captive seal with the sealing material in a relaxed condition.

FIG. 3 is a fragmentary sectional view similar to FIGI. 2 with the sealing material compressed to fill the seal cavity.

DESCRIPTION OF THE PREFERRED EMBODIMENTS

Figure 4:
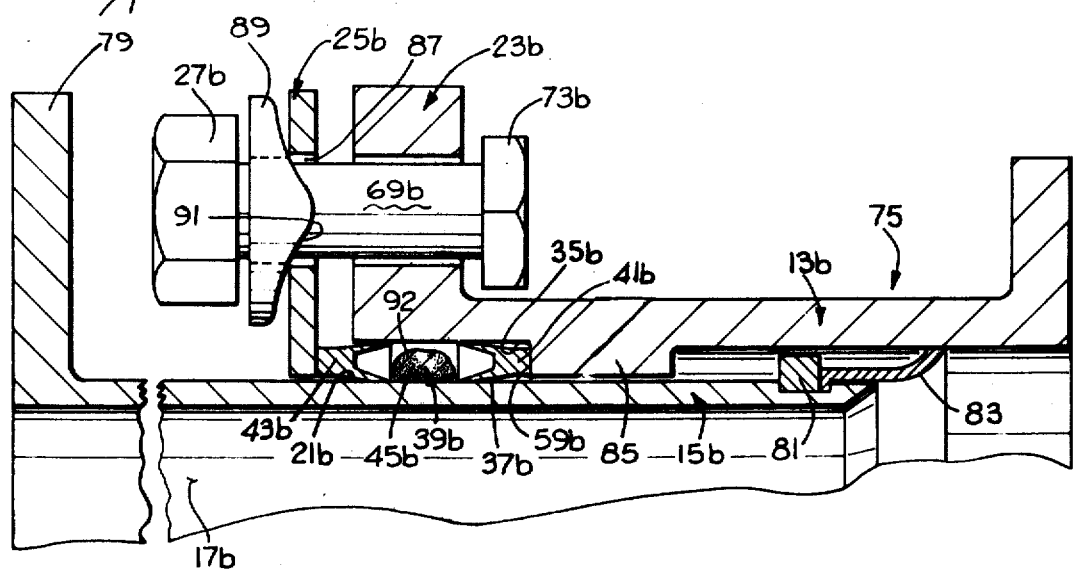
FIG. 4 is a sectional view of a typical expansion joint embodying the captive seal construction of this invention with the sealing material being in a relaxed condition.

FIGS. 1–3 illustrate a ball joint 11 having the captive seal construction of this invention embodied therein. The ball joint 11 includes an outer member 13 and an inner member 15. The members 13 and 15 are tubular and cooperate to define a fluid passage 17 which extends through both of the members. The inner member 15 includes a ball 19 with an outer surface 21 forming part of a sphere.

The outer member 13 includes sections 23 and 25 which are interconnected by a plurality of threaded fasteners 27 (only one being shown in FIGS. 1–3). The outer member 13 circumscribes the ball 19. The sections 23 and 25 include annular races 29 and 31, respectively. Each of the races 29 and 31 has an inner surface 33 forming a part of a sphere. The surfaces 21 and 33 slidably cooperate to mount the outer member 13 for universal pivotal movement, including relative axial rotation, relative to the inner member 15.

The ball joint 11 has numerous applications. However, the ball joint 11 is particularly adapted for carrying liquids at temperatures from +550° F to −100° F. The surface 21 is spaced axially from a circumferential surface 35 of the section 23 to define a seal groove 37. A captive seal assembly 39 is provided in the seal groove 37.

As shown in FIG. 2, the captive seal assembly 39 includes retainers 41 and 43 of substantially identical construction and a sealing mass 45 of deformable sealing material. The surfaces 21 and 35 are the surfaces to be sealed. The retainers 41 and 43 cooperate with the surfaces 21 and 35 to define a completely enclosed seal cavity 47 which the sealing mass 45 completely fills in the compressed condition shown in FIG. 3.

One feature of the invention is that the retainers 41 and 43 need not be resiliently deformable in the axial direction. Thus, in the embodiment illustrated, the retainer 43 is in the form of a block having a pair of radially spaced annular lips or flanges 49 and 51. The lips 49 and 51 and a surface 53 of the retainer 43 cooperate to define a channel-shaped recess 55 which opens axially in the direction of the retainer 41. The recess 55 receives, in the compressed condition of FIG. 3, a portion of the sealing mass 45. The retainer 43 has an annular end face 57.

Portions of the retainer 41 corresponding to portions of the retainer 43 are designated by corresponding reference numerals. The retainer 41 is identical to the retainer 43 except that the recess 55 of the former opens to the right as viewed in FIGS. 2 and 3, i.e., toward the retainer 43.

The lips 49 and 51 are resiliently deformable in the radial direction in response to a force acting radially of the ball joint 11. The lips 49 and 51 tightly and resiliently engage the surfaces 35 and 21, respectively. The lips 49 and 51 retain the viscous sealing material within the seal cavity 47. If the retainers 41 and 43 were totally devoid of resilience in a radial direction, it would be necessary to construct the surfaces 21 and 35 and the retainers 41 and 43 to within very small tolerances. This would increase the cost of manufacturing. Accordingly, radial resilience of at least a portion of the retainers 41 and 43 confronting the sealing mass 45 is preferred. Such resilience can be advantageously provided by the lips 49 and 51.

The retainers 41 and 43 can be constructed of any strong material, such as metal, capable of withstanding the environmental conditions, such as temperature, to which the ball joint 11 will be subjected. The material selected should also allow the lips 49 and 51 to be resiliently deformable in the radial direction. If the retainer is to contact a moving surface, it should have some bearing qualities. For example, the material may be bronze.

The dimension between the surface 53 and the end face 57 of each of the retainers 41 and 43 can be varied provided that the retainers 41 and 43 have sufficient strength for the application in which they are to be used. In the embodiment shown in FIGS. 1–3, this dimension exceeds the axial dimension of the lips 49 and 51.

MOre specifically, the seal groove 37 has an end wall 59 which may be defined in whole by the section 23 or in part by the section 23 and in part by the race 29. The end face 57 of the retainer 41 engages the end wall 59 of the seal groove 37. Thus, the retainer 41 is drivingly associated with the section 23 and is movable therewith in a direction axially to the right as viewed in FIG. 2.

The retainer 43 is slidable axially in the seal groove 37. The retainer 43 is drivingly associated or coupled to the section 25 by a spring, such as Belleville spring 61, and a plurality of shims 63. The shims 63 in turn are seated against a radial surface 65 of the section 25. Specifically, an outer peripheral region of the spring 61 bears against one of the shims 63 and an inner peripheral region of the spring 61 bears against the end face 57 of the retainer 43. Thus, if the section 25 is moved axially to the left as viewed in FIG. 2, a force acting in the same direction is applied by the spring 61 to the retainer 43. Conversely, if the spring 61 is compressed and the member 25 is moved axially to the right as viewed in FIG. 2, this motion of the section 25 will be least partially taken up by expansion of the spring 61 rather than by movement of the retainer 43 axially to the right.

The sealing mass 45 may be constructed of any material usable for captive seal purposes. Although an elastomeric material could be employed, it is preferred to use a plastic material such as fluoroplastic. Examples of suitable fluoroplastics are polytetrafluoroethylene (commonly sold under the trademark (Teflon) and polytrifluorochloroethylene (commonly sold under the trademark Kel-F). Although the usual machined piece of sealing material could be provided, in the embodiment illustrated in FIGS. 1–3, the sealing mass 45 is comprised of an elongated strip of Teflon spirally wound around the ball 19 to form a plurality of layers 67. The length of the strip is selected so that the volume of the sealing mass 45 is correct for the ultimate volume of the seal cavity 47. The spirally wound strip forming the sealing mass is purely illustrative. For example, the strip could be wound helically so that each layer of the strip would be axially space rather than radially spaced.

In use, the captive sealing assembly 39 is positioned in the seal groove 37. The threaded fasteners 27 are tightened to axially advance the sections 23 and 25 toward each other. Because the spring 61 and the end wall 59 engage the retainers 43 and 41, respectively, the retainers are also axially advanced toward each other.

The spring 61 is compressed or flattened as the fasteners 27 are tightened. The axial advance of the retainers 41 and 43 applies an axial compressive load to the sealing mass 45. This compressive load is sufficient to cause the sealing mass to flow and to conform to the shape of the seal cavity. The sealing mass 45 is compressively loaded to such an extent that it flows into all of the minute surface irregularities of the surfaces defining the seal cavity 47 in the position shown in FIG. 3. The pressure developed within the semi-viscous sealing mass 45 forces the lips into tight contact with surfaces 21 and 35, and this prohibits escape of the sealing mass.

The surfaces to be sealed, i.e., the surfaces 21 and 35, contain the sealing mass 45 in a radial direction, and the surfaces of the retainers 41 and 43 engaging the sealing mass 45, form walls for containing the sealing mass 45 in the axial direction. The sealing mass completely fills the seal cavity 47, and the layers 67 form a solid, unitary mass.

It should be noted that the retainers 41 and 43 are moved axially toward each other by axial forces to compressively load the sealing mass against radially spaced surfaces 21 and 35. The compressively loaded sealing mass 45 urges the lips 49 and 51 radially against the surfaces 35 and 21, respectively.

The spring 61 must be sufficiently stiff so that the force required to substantially deflect the spring is adequate to fully load the sealing mass. Preferably the spring 61 will deflect in response to relatively small increases or decreases in the compressive load on the fully loaded sealing mass 45.

The seal groove 37, the seal cavity 47, and the captive seal assembly 39 are annular. Accordingly, the region between the members 13 and 15 is sealed in a zone which completely circumscribes the inner member 15.

In operation of the ball joint 11, the relative pivotal movement between the members 13 and 15 causes the surface 21 to slide relative to the retainers 41 and 43 and the sealing mass 45. However, sealing effectiveness is maintained.

If the sealing mass 45 expands due, for example, to increasing the temperature above ambient, the retainer 43 is urged to the right as viewed in FIG. 3 to further compress the spring 61. Thus, the expansion of the sealing mass 45 is "taken up" by further compression of the spring 61. Conversely, if the temperature of the sealing assembly is reduced below ambient, the sealiing mass 45 tends to thermally shrink or contract a greater amount then the seal cavity 47. Accordingly, there is a tendency to lose some of the compressive load on the sealing mass 45. With the present invention, at least some of this loss is "taken up" by expansion of the spring 61 which forces the retainer 43 to the left. Thus, a high compressive load is maintained on the sealing mass 45 even under reduced temperatures.

Figure 5:
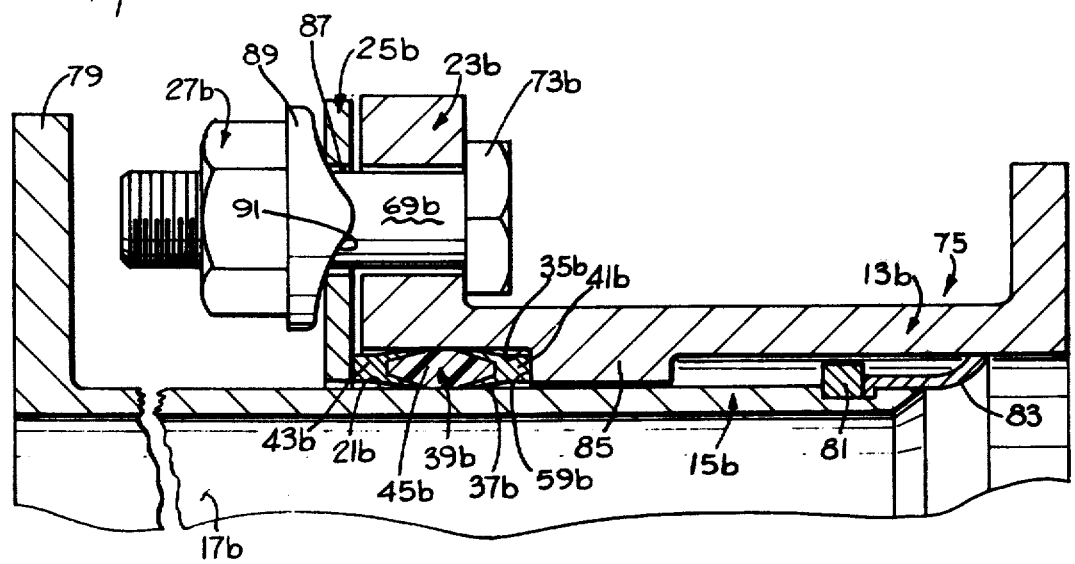
FIG. 5 is a sectional view similar to FIG. 5 with the sealing material in a compressed condition.

FIGS. 4 and 5 show an expansion joint 75 which employs a captive seal assembly 39b which is identical to the captive seal assembly 39 (FIGS. 1–3). The expansion joint 75 is particularly adapted for carrying liquids at from 550° F down to −100° F. Portions of the expansion joint 75 corresponding to portions of the ball joint 11 are designated by corresponding reference numerals followed by the letter b. Aside from the fact that the joint 75 is an expansion joint and the joint 11 is a ball joint, the primary difference between these embodiments is the manner of resiliently loading the captive seal assembly. As set forth more specifically hereinbelow, the section 25b is in the form of a resilient annular flange and as such constitutes a portion of the resilient means for resiliently loading the captive seal assembly 39b. In addition, the fasteners 27b may also form part of the resilient means.

The expansion joint 75 includes an outer member 13b and an inner member 15b which cooperate to define a fluid passage 17b extending through both of the members. The inner member 15b has a cylindrical outer surface 21b and a flange 79 to permit the inner member 15b to be attached to external structure (not shown). A snap ring retainer 81 and a scraper 83 are carried by the inner end of the inner member 15b.

Figure 6:
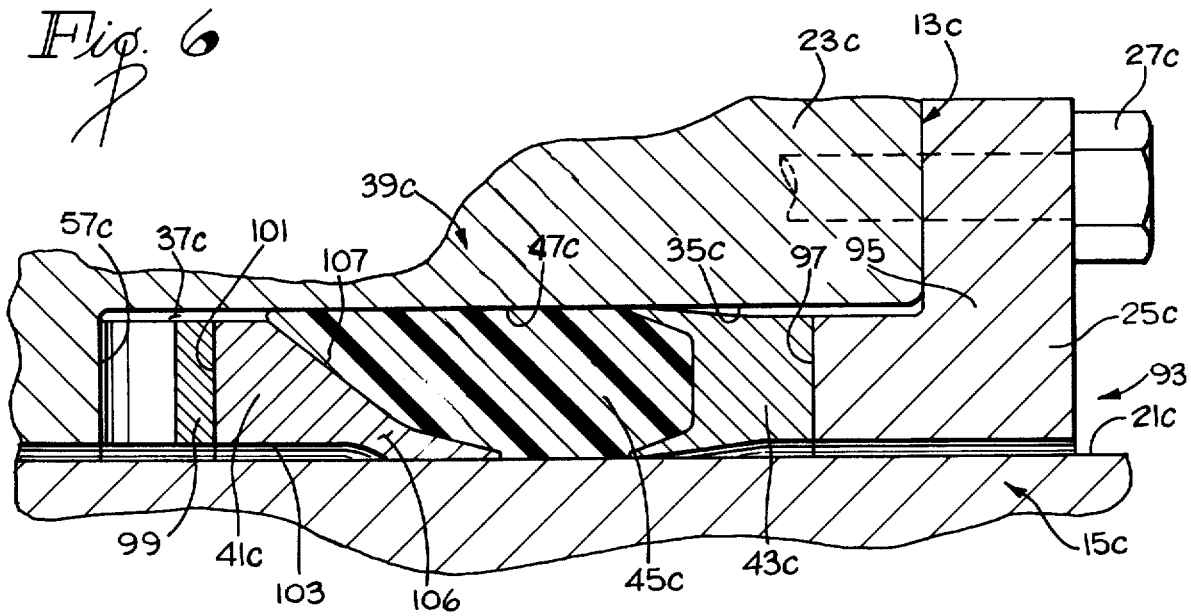
FIG. 6 is a sectional view of a joint embodying a cryogenic captive seal construction of this invention with the sealing material being in a compressed condition at ambient or higher temperatures.

The outer member 13b includes sections 23b and 25b interconnected by fasteners 27b (only one being shown in FIGS. 5 and 6). Each of the members 13b and 15b are tubular and the outer member surrounds the inner member. The section 25b has an internal annular rib 85 which cooperates with the retaining ring 81 to retain the inner member 15b within the outer member 13b. The members 13b and 15b are relatively movable in the axial direction and can be axially rotated relative to each other. The rib 85 also provides an end wall 59b. The section 23b has a surface 35b which is radially spaced from the surface 21b to define a seal groove 37b.

The captive seal assembly 39b is resiliently loaded by the resilient section 25b. The section 25b includes a plurality of openings 87, one being provided for each of the fasteners 27b. Each of the fasteners 27b includes a bolt 69b extending through the section 25b and through a flange of the section 23b, a nut 73b and a fulcrum washer 89 having a conical surface 91.

Although the sealing mass 45b could take different forms, in the embodiment of FIGS. 4 and 5, it includes particles 92 of sealing material. When the particles 92 are highly compressively loaded as shown in FIG. 5, they form basically a unitary mass.

To compressively load the sealing mass 45b, the nuts 73b are tightened to advance the sections 25b and 23b axially toward each other. As the nuts 73b are tightened, the section 25b and the bolt 69b elastically deflect as shown in FIG. 5 thereby providing a resilient axial load on the retainer 43b which is, in turn, transmitted to the sealing mass 45b. Specifically, the section 25b bends axially to the left as it extends radially inwardly and the bolts axially elongate. The section 25b and the bolts 69b compensate for loss of compression or increased compression due to temperature change of the sealing mass 45b in the same manner described hereinabove with reference to FIGS. 1–3.

The section 25b and the bolts 69b should be constructed of a resilient material such as metal. The total deflection of the bolts 69b can be increased by increasing the length and strength of the bolts. The section 25b provides for the primary amount of the elastic deflection.

Figure 7:
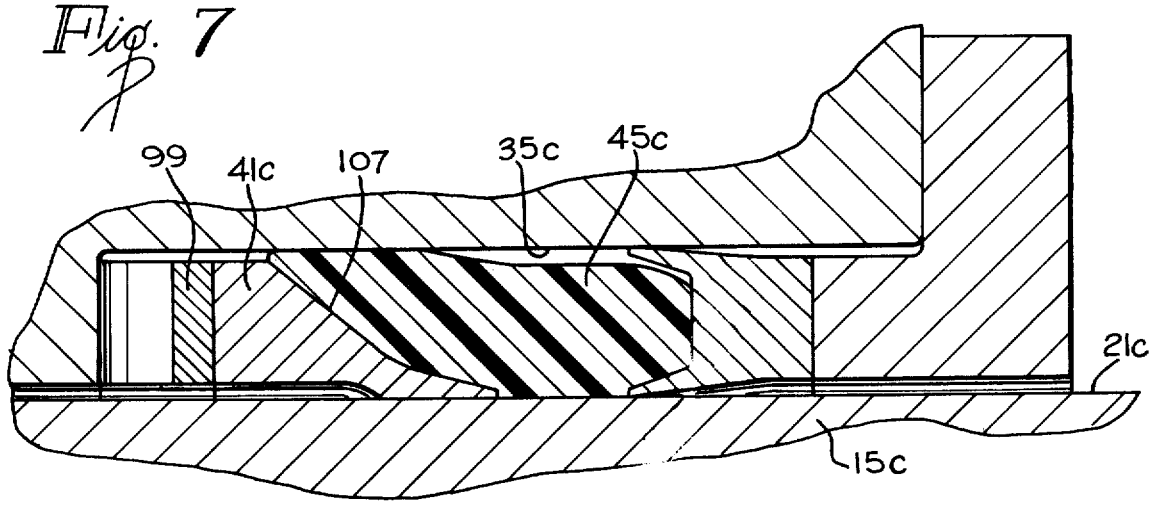
FIG. 7 is a sectional view similar to FIG. 6 with the sealing material compressed and partially shrunk away from the outer surface of the seal cavity under cryogenic conditions.
Figure 8:
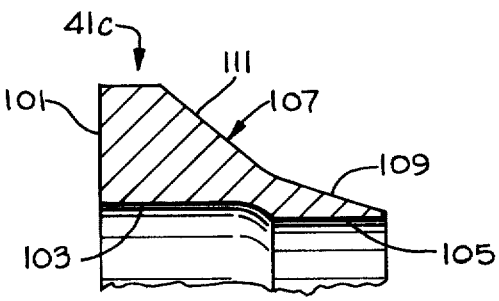
FIG. 8 is a sectional view of a ramp retainer in the unloaded condition.

FIGS. 6–8 show a joint 93 which embodies a captive seal assembly 39c. Portions of the joint 93 corresponding to portions of the ball joint 11 are designated by corresponding reference numerals followed by the letter c. The joint 93 is particularly adapted for cryogenic service, i.e., down to $-450°$ F. The joint 93 includes an outer member 13c and an inner member 15c. The inner member 15c is in the form of a rod or stem mounted for axial movement and/or rotation relative to the member 13c. For example, the inner member 15c may be a valve stem. The inner member 15c has a cylindrical surface 21c.

The outer member 13c includes sections 23c and 25c and a plurality of fasteners 27c for advancing the sections 23c and 25c axially toward each other. The section 23c has a circumferential surface 35c and an end face 57c which cooperates with the surface 21c to define an annular seal groove 37c. The section 25c is annular and the fastener 27c passes through a radial flange 95 thereof. The section 25c has an annular end face 97 which defines one of the axial ends of the seal groove 37c.

The captive seal assembly 39c is identical to the captive seal assembly 39 (FIGS. 1–3) in all respects not specifically described herein. One difference is that the retainer 41c is of a different configuration and a waveform spring 99 is used in lieu of the Belleville spring 61. The sealing mass 45c may be of the type described with reference to FIGS. 1–3 or it may be a single machined mass of appropriate volume.

The retainer 41c is shown in the unloaded condition in FIG. 8. The retainer 41c has an annular end face 101 and concentric circumferentially extending surfaces 103 and 105. As shown in FIG. 9, the radius of the surface 105 is less than the radius of the surface 103. The retainer 41c also has a ramp or cam surface 107 whic includes a portion 109 of relatively gentle slope and a portion 111 of a steeper slope.

The ramp 107 extends radially outwardly as it extends axially toward the end face 101. The retainer 41c is radially thicker adjacent the end face 101, i.e., the heel end, and relatively radially narrow adjacent the intersection of the surfaces 105 and 109, i.e., the toe end.

The spring 99 extends completely around the inner member 15c. With the retainer 41c positioned in the seal groove 37c, the spring 99 acts between the end face 57c and 101 to urge the retainer 41c axially to the right. The annular end face 97 bears against the retainer 43c. By tightening up the fasteners 27c, the retainers 41c and 43c are axially advanced by the sections 23c and 25c, respectively, to compressively load the sealing mass 45c in the manner described hereinabove so as to conform to the seal cavity 47c.

The captive sealing assembly 39c functions in generally the same manner as described hereinabove in the event of any relaxation in, or expansion of, the sealing mass 45c. In addition, the construction of FIGS. 6–8 affords additional advantages under cryogenic conditions. Specifically, any shrinkage of the sealing mass 45c will result in circumferential shrinkage of that mass. This means that the sealing mass 45c will continue to tightly engage the surface 21c of the inner member 15c. However, such shrinkage of the sealing mass 45c may result in the sealing mass shrinking away from the circumferential surface 35c. As illustrated by way of example in FIG. 7, as the sealing mass 45c decompresses, the spring 99 expands urging the retainer 41c to the right toward the sealing mass. The portions of the sealing mass 45c lying directly radially outwardly of the ramp 107 are cammed or wedged radially outwardly by the ramp 107 and forced in tight sealing contact with circumferential surface 35c. The retainers in the illustrated embodiments of the invention are separate members. However, one or both of the retainers may be integral with the associated sections 23 and 25. The captive seals shown herein are effective against pressure acting in either direction.

Although exemplary embodiments of the invention have been shown and described, many changes, modifications, and substitutions may be made by those having ordinary skill in the art without necessarily departing from the spirit and scope of this invention.

I claim:

1. A captive seal construction comprising:
   an outer member and an inner member, said outer member at least substantially circumscribing said inner member;
   at least one of said members including first and second sections;
   means for relatively moving said sections toward each other;
   said outer and inner members including first and second srufaces, respectively, said first and second surfaces being radially spaced to define a seal groove therebetween;
   a sealing mass of deformable sealing material in said seal groove;
   means including at least portions of said first and second surfaces and first and second retainers for defining a substantially completely enclosed seal cavity for said sealing mass, said retainers being axially arranged in said seal groove and on opposite sides of said sealing mass, said retainers being relatively movable in a generally axial direction to reduce the volume of said seal cavity;
   means for drivingly associating said first retainer with said first section;
   means for drivingly associating said second retainer with said second section whereby movement of said sections toward each other tends to move said retainers generally axially toward each other to reduce the volume of the seal cavity and to compressively load said sealing mass, said compressive load being sufficient to cause plastic flow of said sealing mass and to cause the sealing mass to substantially fill said seal cavity;
   resilient means for resiliently urging said first retainer generally axially in a direction to reduce the volume of the seal cavity; and
   said first retainer having first and second resilient lips engageable with said first and second surfaces of said members, respectively, said lips at least partially defining an axially opening recess opening toward and at least partially receiving said sealing mass.

2. A captive seal construction as defined in claim 1 wherein said sealing mass includes a plurality of particles prior to compressive loading of the sealing mass.

3. A captive seal construction as defined in claim 1 wherein said members are mounted for relative movement, at least one of said retainers having first and second resilient lips engageable with said first and second surfaces of said members, respectively, said lips at least partially defining a recess opening toward and at least partially receiving said sealing mass.

4. A captive seal construction as defined in claim 1 wherein said second retainer includes inclined surface means for camming one end portion of the sealing mass radially outwardly, into tight engagement with said first surface.

5. A captive seal construction as defined in claim 1 wherein said resilient means includes a spring interposed between said first section and said first retainer for urging said first section and said first retainer in generally opposite directions.

6. A captive seal construction as defined in claim 1 wherein said means for moviing said first section toward said second section includes a fastener, said resilient means including said fastener.

7. A captive seal construction as defined in claim 1 wherein said first section is resiliently deformable and said resilient means includes said first section.

8. A captive seal construction as defined in claim 1 wherein said means for moving said sections toward each other includes a plurality of fasteners, said first section including a resilient annular member, said fasteners extending through said resilient annular member, said resilient means including said resilient annular member.

9. A captive seal construction as defined in claim 1 wherein said sealing mass includes a plurality of discrete sections prior to compressive loading of the sealing mass.

10. A captive seal construction as defined in claim 1 wherein said second retainer has first and second resilient lips engageable with said first and second surfaces of said members, respectively, said lips of said second retainer at least partially defining a recess opening toward and partially receiving said sealing mass.

11. A captive seal construction as defined in claim 1 wherein each of said first surface and said second surface is at least partially spherical.

12. A captive seal construction comprising:
    an outer member and an inner member, said outer member at least substantially circumscribing said inner member;
    at least one of said members including first and second sections;
    means for relatively moving said sections toward each other;
    said outer and inner members including first and second surfaces, respectively, said first and second surfaces being radially spaced to define a seal groove therebetween;
    a sealing mass of deformable sealing material in said seal groove;
    means including at least portions of said first and second surfaces and first and second retainers for defining a substantially completely enclosed seal cavity for said sealing mass, said retainers being axially arranged in said seal groove and on opposite sides of said sealing mass, said retainers being relatively movable in a generally axial direction to reduce the volume of said seal cavity;
    means for drivingly associating said first retainer with said first section;
    means for drivingly associating said second retainer with said second section whereby movement of said sections toward each other tends to move said retainers generally axially toward each other to reduce the volume of the seal cavity and to compressively load said sealing mass, said compressive load being sufficient to cause plastic flow of said sealing mass and to cause the sealing mass to substantially fill said seal cavity;

resilient means for resiliently urging said first retainer generally axially in a direction to reduce the volume of the seal cavity; and said second retainer including inclined surface means for camming one end portion of the sealing mass radially outwardly into tight engagement with said first surface.

13. A captive seal construction as defined in claim 12 wherein said inclined surface means includes a ramp which extends radially outwardly as it extends axially outwardly, said ramp terminating closely adjacent said first surface.

14. A captive seal construction comprising:

a sealing mass of deformable sealing material, said sealing mass having first and second surfaces;

wall means for defining a substantially enclosed seal cavity, said sealing mass being within said seal cavity;

said wall means including first and second retainers, said first retainer having first and second radially spaced resilient annular lips at least partially defining a first annular recess opening axially toward said second retainer, said recess receiving at least portions of said sealing means;

said wall means including third and fourth radially spaced surfaces against which it is desired to seal, said first and second surfaces being engageable with said third and fourth surfaces, respectively, and said first and second lips being resiliently engageable with said third and fourth surfaces, respectively;

said retainers being relatively movable in a direction having an axial component to move said retainers closer together to thereby cause said sealing mass to flow and substantially fill said seal cavity; and means including a resilient member for relatively moving said retainers in said direction.

* * * * *